US009052052B2

(12) United States Patent
Kamiyama et al.

(10) Patent No.: US 9,052,052 B2
(45) Date of Patent: Jun. 9, 2015

(54) SEGMENT FOR A REHABILITATION PIPE, AND PIPE REHABILITATION METHOD (71) Applicant: Shonan Gosei-Jushi Seisakusho K.K., Kanagawa-ken (JP)

(72) Inventors: Takao Kamiyama, Kanagawa-ken (JP); Koji Kaneta, Kanagawa-ken (JP); Kenji Fujii, Kanagawa-ken (JP); Makoto Ishida, Kanagawa-ken (JP)

(73) Assignee: SHONAN GOSEI-JUSHI SEISAKUSHO K.K. (JP)

( * ) Notice: Subject to any disclaimer, the term of this patent is extended or adjusted under 35 U.S.C. 154(b) by 92 days.

(21) Appl. No.: 13/753,927

(22) Filed: Jan. 30, 2013

(65) Prior Publication Data
US 2014/0096855 A1  Apr. 10, 2014

(30) Foreign Application Priority Data
Oct. 10, 2012 (JP) .................. 2012-224677

(51) Int. Cl.
*F16L 55/163* (2006.01)
*F16L 55/1645* (2006.01)

(52) U.S. Cl.
CPC ......... *F16L 55/163* (2013.01); *F16L 55/16455* (2013.01)

(58) Field of Classification Search
USPC .............. 405/184.1, 184.2, 302.1; 138/97, 99
See application file for complete search history.

(56) References Cited

U.S. PATENT DOCUMENTS

| | | | | |
|---|---|---|---|---|
| 6,796,334 B2* | 9/2004 | Ishikawa et al. | ................ | 138/98 |
| 7,056,064 B2* | 6/2006 | Kamiyama et al. | ........... | 405/146 |
| 7,156,124 B2* | 1/2007 | Kamiyama et al. | ............. | 138/98 |
| 7,165,578 B2* | 1/2007 | Kamiyama et al. | ............. | 138/98 |
| 7,322,382 B2* | 1/2008 | Kamiyama et al. | ........... | 138/162 |
| 7,341,280 B2* | 3/2008 | Kamiyama et al. | ............. | 285/15 |
| 7,451,783 B2* | 11/2008 | Kamiyama et al. | ............. | 138/98 |
| 7,506,895 B2* | 3/2009 | Kamiyama et al. | ............. | 285/15 |
| 7,819,435 B2* | 10/2010 | Kamiyama et al. | ............. | 285/15 |
| 8,240,339 B2* | 8/2012 | Kamiyama et al. | ............. | 138/98 |
| 8,360,108 B2* | 1/2013 | Kamiyama et al. | ............. | 138/98 |
| 2006/0001258 A1* | 1/2006 | Kamiyama et al. | ............. | 285/15 |
| 2010/0307624 A1* | 12/2010 | Kamiyama et al. | ............. | 138/98 |

* cited by examiner

*Primary Examiner* — Benjamin Fiorello
*Assistant Examiner* — Kyle Armstrong
(74) *Attorney, Agent, or Firm* — Adams & Wilks (57) ABSTRACT A segment for a rehabilitation pipe includes an inner surface plate having an inner circumferential surface, and side plates and end plates provided upright on a peripheral edge of the inner surface plate. The inner surface plate, the side plates, and the end plates are formed integrally from a plastic material. The segments are linked in a circumferential direction and in a pipe-length direction to install a segmental rehabilitation pipe inside an existing pipe. The end plates are provided with an insertion hole through which a linking member is inserted for linking the segments in the circumferential direction. Separately from the insertion hole, the end plates are further provided with an opening for passing therethrough a filler material injected into a space between the existing pipe and the rehabilitation pipe.

4 Claims, 9 Drawing Sheets

SEGMENT FOR A REHABILITATION PIPE, AND PIPE REHABILITATION METHOD

BACKGROUND OF THE INVENTION

1. Field of the Invention

The present invention relates to a segment for a rehabilitation pipe comprising an inner surface plate constituting an inner circumferential surface, and side plates and end plates provided upright on peripheral edges of the inner surface plate, wherein the inner surface plate, the side plates, and the end plates are formed integrally from a plastic material and the segments are linked in the circumferential direction and in the pipe-length direction to construct a rehabilitation pipe inside an existing pipe. The present invention also relates to a pipe rehabilitation method using the segments.

2. Description of the Related Art

In cases in which a sewage pipe or another pipeline buried underground has deteriorated through aging, a pipe lining method has been proposed and practiced in which a lining is provided to the inner circumferential surface thereof to repair the pipeline without excavating it from the ground.

In this pipe lining method, a pipe lining material made of a tubular resin absorbent material impregnated with an uncured thermosetting resin is everted and inserted into a pipeline using fluid pressure, and is pressed by fluid pressure against the inner peripheral wall of the pipeline. The lining material is then heated using a desired method to cure the thermosetting resin therein and form a plastic pipe, thereby repairing the pipeline.

There is also known a lining method using segments each comprising an inner surface plate constituting an inner circumferential surface, side plates and end plates provided upright on the peripheral edges of the inner surface plate, these plates being integrally formed from a plastic material.

The segments are linked in the circumferential direction to assemble short pipe units, which are then linked in the pipe-length direction to construct a rehabilitation pipe inside an existing pipe (for example, JP-A 2005-264635). Such a pipe rehabilitation method is used for large-diameter existing pipes. In this method, after assembling a rehabilitation pipe inside the existing pipe, grout or another filler material is injected into a space between the existing pipe and the rehabilitation pipe and hardened to construct a composite pipe.

SUMMARY OF THE INVENTION

In the rehabilitation pipe described in JP-A 2005-264635, holes or notches for admitting insertion of bolts and other linking members used to link the segments in the pipe length direction are provided to the side plates and the inner plates of the segment, and the notches also function as a channel for causing the filler material to flow in or out. An insertion hole for admitting insertion of a linking member when the segments are linked in the circumferential direction is also provided to the end plate of the segment, and the filler material can pass through the insertion hole and flow in or flow out in the circumferential direction. However, when a linking member is inserted into the insertion hole or the notch, the cross-section area through which the filler passes is reduced, injection of the filler material is prevented from being performed in a smooth manner, and the efficiency of the injection operation is reduced.

It is therefore an object of the present invention to provide a segment for a rehabilitation pipe enabling the injection of the filler material to be performed in a smooth, uniform, and speedy manner, and to provide a pipe rehabilitation method using the segments.

The present invention provides a segment for a rehabilitation pipe and a pipe rehabilitation method using the segments. The segment comprises an inner surface plate constituting an inner circumferential surface, and side plates and end plates provided upright on a peripheral edge of the inner surface plate. The inner surface plate, the side plates, and the end plates are formed integrally from a plastic material, and the segments are linked in a circumferential direction and in a pipe-length direction to install a segmental rehabilitation pipe inside an existing pipe. The end plates are provided with an insertion hole through which a linking member is inserted when the segments are linked in the circumferential direction, and provided separately from the insertion hole with an opening for passing therethrough a filler material injected into a space between the existing pipe and the rehabilitation pipe.

The present invention also provides a segment for a rehabilitation pipe and a pipe rehabilitation method using the segments. The segment comprises an inner surface plate constituting an inner circumferential surface, side plates and end plates provided upright on a peripheral edge of the inner surface plate, and inner plates provided upright between the side plates so as to be parallel to the side plates. The inner surface plate, the side plates, the end plates and the inner plates are formed integrally from a plastic material and the segments are linked in a circumferential direction and in a pipe-length direction to install a segmental rehabilitation pipe inside an existing pipe. The side plates and the inner plates are provided at respective upper edges thereof with a plurality of notches for passing therethrough a filler material injected into a space between the existing pipe and the rehabilitation pipe when installing the rehabilitation pipe in the existing pipe. The positions of the notches provided to the side plates are different in the circumferential direction from those of the notches provided to the inner plates.

According to the present invention, the end plates are provided with an insertion hole through which a linking member is inserted when the segments are linked in the circumferential direction, and provided separately from the insertion hole with an opening for passing therethrough a filler material injected into a space between the existing pipe and the rehabilitation pipe. Therefore, the filler material can flow in or out in the circumferential direction through the opening provided to the end plate, making it possible to perform injection of the filler material in a uniform and smooth manner.

Also, according to the present invention, the side plates and the inner plates are provided at respective upper edges thereof with a plurality of notches for passing therethrough a filler material injected into a space between the existing pipe and the rehabilitation pipe when installing the rehabilitation pipe in the existing pipe, and the positions of the notches provided to the side plates are different in the circumferential direction from those of the notches provided to the inner plates. Therefore, the filler material flows along the pipe-length direction through the notches. Furthermore, the flow of the filler material reaches all sections and the filling can be performed in a uniform and speedy manner because the notches of the side plate and the inner plate are staggered in the circumferential direction when the segment is viewed from above (outside).

Further features of the invention, its nature and various advantages will be more apparent from the accompanying drawings and following detailed description of the invention.

BRIEF DESCRIPTION OF THE DRAWINGS

FIG. 2b is a cross-sectional view along line B-B in FIG. 2a;

FIG. 2c is a detailed view of an end plate of the segment viewed from the direction of line A-A in FIG. 2a;

FIG. 3b is a cross-sectional view along line C-C in FIG. 3a;

DESCRIPTION OF THE PREFERRED EMBODIMENTS

The present invention will now be described with references to embodiments illustrated in the accompanying drawings. The present invention is suitable for rehabilitating or repairing sewage pipes, water supply pipes, tunnels, agricultural irrigation channels, and other existing large-diameter pipes. In the present embodiment, the rehabilitation pipes are described as having a circular cross-section profile orthogonal to the pipe-length direction. However, it shall be apparent that the present invention can be applied to a rehabilitation pipe having a square or another non-circular cross-section. Also, in addition to structures in which the cross-section profile is closed as a pipe, a structure having a horseshoe-shaped, semi-circular, U-shaped, or another cross-section profile in which one side is open can also be considered to be a pipe, and the present invention can also be applied thereto.

Figure 6:
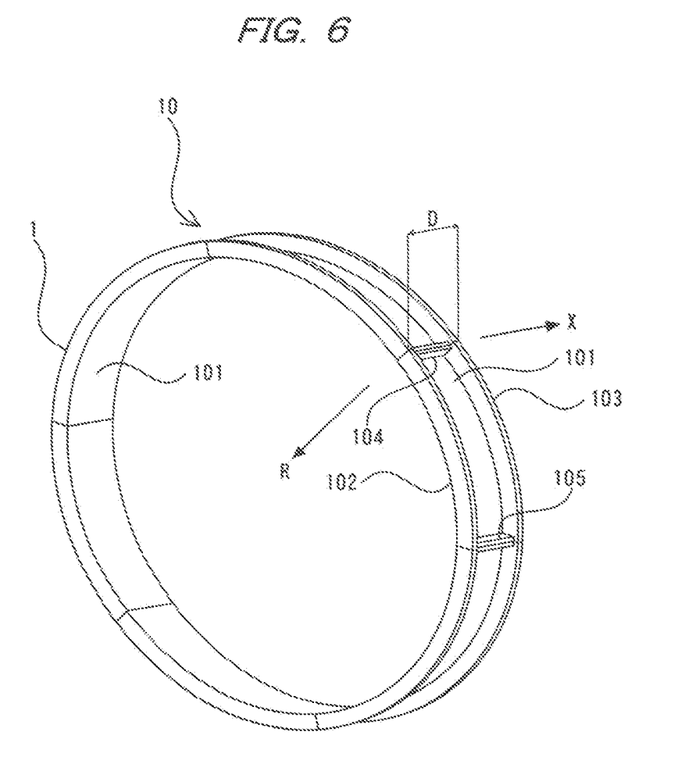
FIG. 6 is a perspective view showing a state in which the segments are linked in the circumferential direction to assemble a pipe unit.

In the present specifications, the pipe-length direction refers to the direction indicated by arrow X extending in the longitudinal direction of a pipe unit 10 in FIG. 6, the radial direction refers to the direction indicated by the radial arrow R pointing towards the center axis of the pipe unit 10, and the circumferential direction refers to the direction of the circumference of the circle forming the pipe unit 10.

Figure 1:
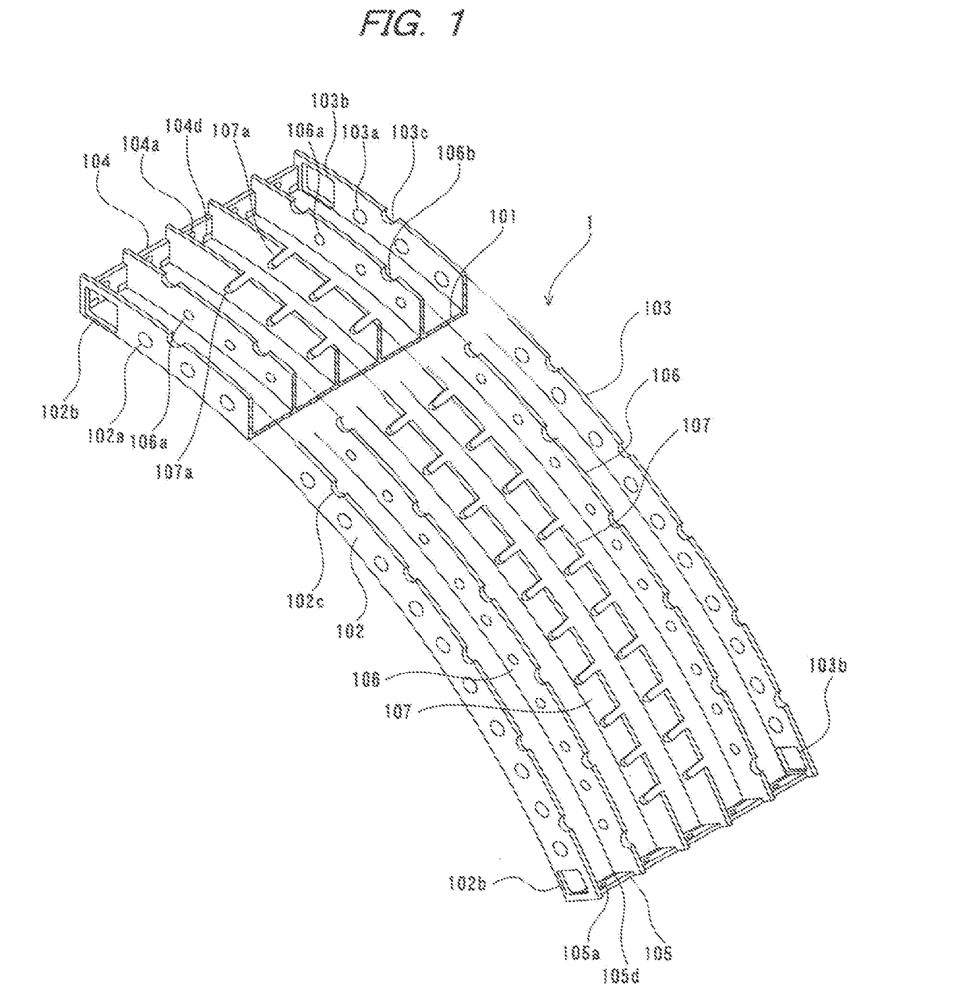
FIG. 1 is a perspective view showing the structure of a segment used in assembling the rehabilitation pipe.

FIG. 1 shows the structure of a segment 1 for pipe rehabilitation (hereafter simply referred to as "segment"), which represents an assembly unit member of a rehabilitation pipe for rehabilitating an existing pipe. The segment 1 is an integrally formed block-shaped member made from a plastic material, comprising an inner surface plate 101 constituting an inner circumferential surface of the rehabilitation pipe, side plates 102, 103 provided vertically upright on both sides extending in the circumferential direction of the inner surface plate 101, and end plates 104, 105 provided vertically upright on both ends extending in the pipe-length direction of the inner surface plate 101.

In the present embodiment, the segment 1 has a shape that is curved as an arc representing a predetermined angle that equally divides the circumference, e.g., a 60° arc that divides the circumference into sixths. However, the segment is not limited to that having an arc or a fan shape. The segment may be shaped as, e.g., a cuboid or a shape that is bent so as to have a curved right angle depending on the cross-section profile or the size of the existing pipe or the location of the existing pipe to be repaired.

A plurality (four in the present embodiment) of inner plates 106, 107 having a shape similar to that of the side plates are provided upright at equal intervals and parallel to the side plates 102, 103 on the upper surface of the inner surface plate 101 and on the inside relative to the side plates 102, 103 in order to reinforce the mechanical strength of the segment 1. One or both of the inner plates 106, 107 can be omitted if the segment 1 has sufficient strength.

The inner surface plate 101, the side plates 102, 103, the end plates 104, 105, and the inner plates 106, 107 are all made from an identical transparent, semi-transparent or opaque plastic material, and are integrally formed using a known molding technique.

Figure 2A:
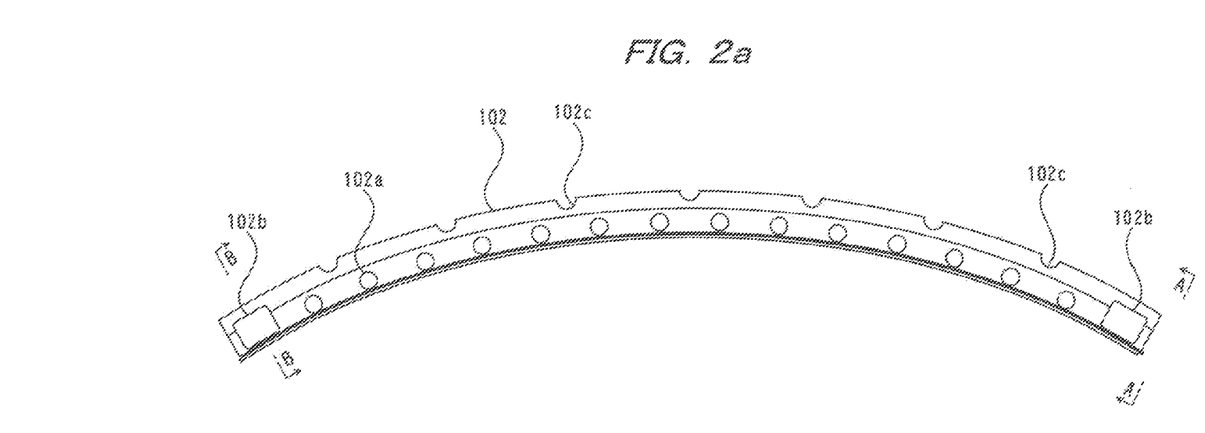
FIG. 2a is a front view of a side plate of a segment.
Figures 2B, 2C:
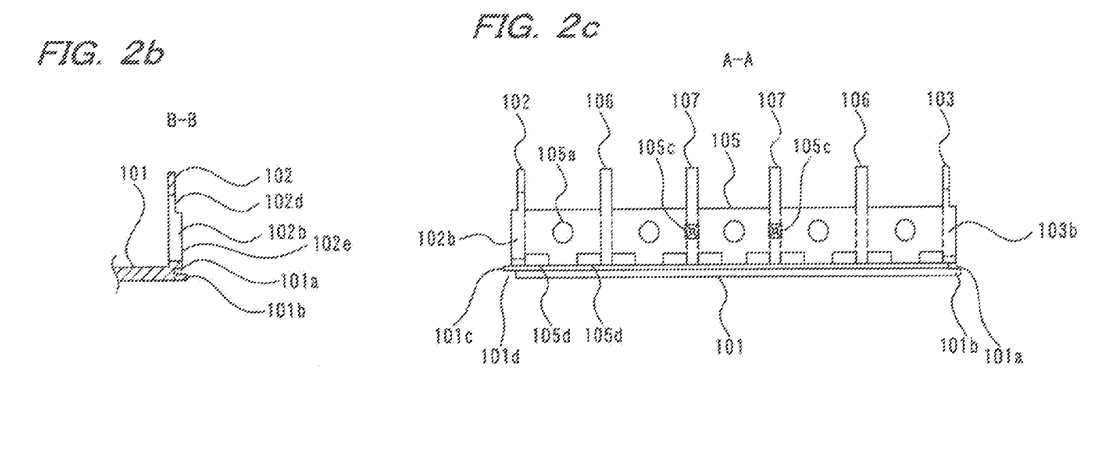

FIG. 2a is a detailed view of the side plates 102, 103, and FIG. 2b is a cross-section view along the line B-B in FIG. 2a. The following descriptions are given in relation to the side plate 102, but the side plate 103 has a configuration similar to that of the side plate 102.

The side plate 102 is an arc-shaped thin-plate member, and an upper section 102d has a smaller plate thickness than that of a lower section 102e. This is in order to form a gap on the upper part of the two side plates 102, 103 when one segment is liked to another segment adjacent in the pipe-length direction, and to guide and accommodate earth and other material entering from the exterior.

A plurality of holes 102a for admitting insertion of a liking member for linking the segment 1 in the pipe-length direction are provided at equal intervals along the circumference on the lower section 102e of the side plate 102. The holes 102a in the side plate 102 and holes 103a in the side plate 103 are located at coinciding positions along the circumferential direction, allowing the liking member to be inserted through the holes 102a and 103a in the side plates 102 and 103.

An opening 102b, used for a linking operation of the segments in the circumferential direction, is provided to the side plate 102 in the vicinity of both ends in the circumferential direction, i.e., at both ends in the vicinity of the end plates 104, 105. Each of the openings 102b has a rectangular shape in which corners are chamfered.

A lower edge of the opening 102b substantially coincides with a lower edge of the side plate 102, and an upper edge of the opening 102b is somewhat lower than an upper edge of the side plate 102. When the segments are connected in the circumferential direction, a bolt, a nut, or another linking member is, e.g., positioned or tightened through the opening 102b (see also FIG. 5c).

The opening 102b is configured so that a filler material injected into a space between the existing pipe and the segmental rehabilitation pipe can flow in or out through the opening 102b, and so that during injection, the filler material can pass through the opening 102b in a smooth and speedy manner. It is also possible to provide the openings 102b, 103b to the vicinity of the end plate 104 only or to the vicinity of the end plate 105 only.

Notches 102c for allowing the filler material to flow in or out and pass therethrough are provided to an upper section of the side plate 102. The notches 102c have a half-moon shape in which the upper end is open. The notches 102c are positioned in the circumferential direction so as to be displaced from the positions of the holes 102a in the circumferential direction. More specifically, a notch 102c is provided between the hole 102a nearest to the end plates 104, 105 and the next hole 102a, and then provided every two holes 102a. Thus, a total of seven notches 102c are provided to the side plate 102.

FIG. 2c is a detailed view of the end plate 105 as viewed from line A-A in FIG. 2a. The following descriptions are given in relation to the end plate 105, but the end plate 104 has a configuration similar to that of the end plate 105.

The end plate 105 is a rectangular thin-plate member arranged between the side plate 102 and the side plate 103. The height of the end plate 105 from the outer surface of the inner surface plate 101 is slightly lower than that of the side plates 102, 103. Circular insertion holes 105a for admitting insertion of a bolt or another linking member for linking the segment 1 in the circumferential direction are provided on the end plate 105 between the side plate 102 and an inner plate 106, between the inner plate 106 and an inner plate 107, between the two inner plates 107, between the inner plate 107 and an inner plate 106, and between the inner plate 106 and the side plate 103.

A concave section 101a and a convex section 101b are provided to the inner surface plate 101 along the entire length of the circumferential direction on one end thereof in the pipe-length direction (right end in FIG. 2c). A convex section 101c and a concave section 101d are provided on the other end so that the convex/concave relationship is inverted. As a result, when the segments are linked in the pipe-length direction, the concave and convex sections of segments that are adjacent in the pipe-length direction engage with each other and fulfill the function of guiding or positioning of the segments. This facilitates the operation of linking the segments in the pipe-length direction.

A rectangular opening 105d for allowing the filler material to flow in or out and pass therethrough is provided to both sides of the inner plates 107, both sides of the inner plates 106, and the inside of the side plates 102, 103 at the lower end of the end plate 105.

Figure 5A:
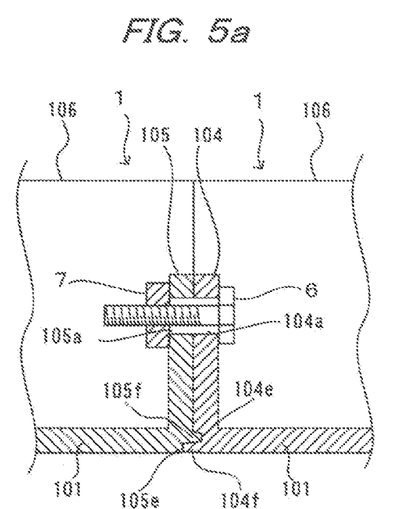
FIG. 5a is a cross-sectional view showing the segments linked in the circumferential direction with a bolt and a nut.
Figure 5B:
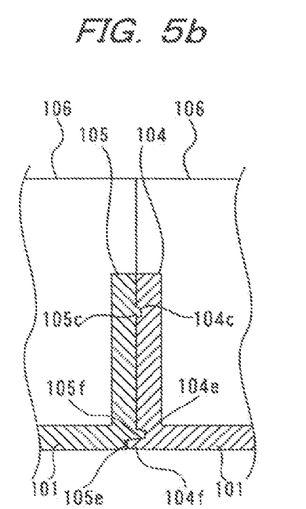
FIG. 5b is a cross-sectional view showing the segments linked in the circumferential direction.

A convex section 105c is provided on the end plate 105 at a position at which it intersects the inner plate 107, and is fitted into a concave section 104c provided to the corresponding position on the end plate 104 that is adjacent in the circumferential direction (see also FIG. 5b).

Figure 3A:
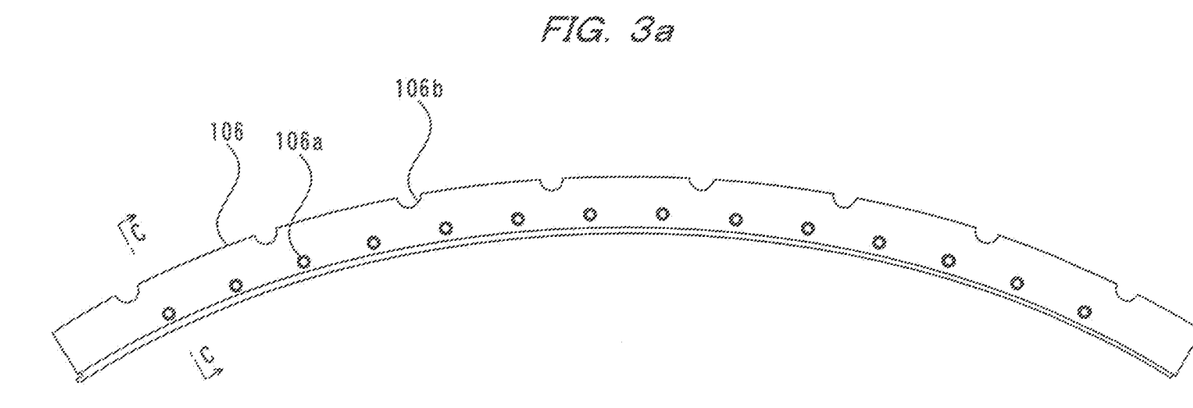
FIG. 3a is a front view of an inner plate of the segment.
Figure 3B:
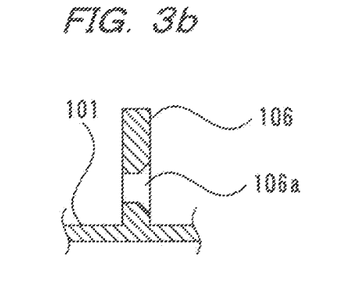

FIG. 3a is a detailed view of the inner plate 106, and FIG. 3b is a cross-sectional view along the line C-C in FIG. 3a. Each of the inner plates 106 is a thin-plate member having a profile substantially identical to the side plates 102, 103. Circular holes 106a for admitting insertion of linking members for linking the segments in the pipe-length direction are provided at equal intervals to a lower section of the inner plate 106. The positions of the holes 106a in the circumferential direction coincide with those of the holes 102a of the side plate 102. As shown in FIG. 3b, the diameter of each of the holes 106a increases from the vicinity of the center of the plate thickness of the inner plate 106 towards the outside (i.e., the side towards the side plate).

Notches 106b for allowing the filler material to flow in or out and pass therethrough are provided to the upper section of the inner plate 106. The notches 106b have a half-moon shape in which the upper end is open. The positions of the notches 106b are different in the circumferential direction from those of the holes 102a, 106a.

More specifically, a notch 106b is provided further towards the end plate than the hole 106a nearest to the end plates 104, 105, and are provided every two holes 106a. Thus, a total of eight notches 106b are provided. Therefore, the positions of the notches 106b in the circumferential direction are displaced from those of the notches 102c of the side plate 102 by an amount equivalent to the intervals between the holes 106a in the circumferential direction. The notches 106b and the notches 102c are thus in a staggered arrangement when the segment is viewed from above.

This also applies to the notches 103c provided to the side plate 103 for passing the filler material, and to the notches 106b formed on the inner plate 106 adjacent to the side plate 103.

Figure 4:
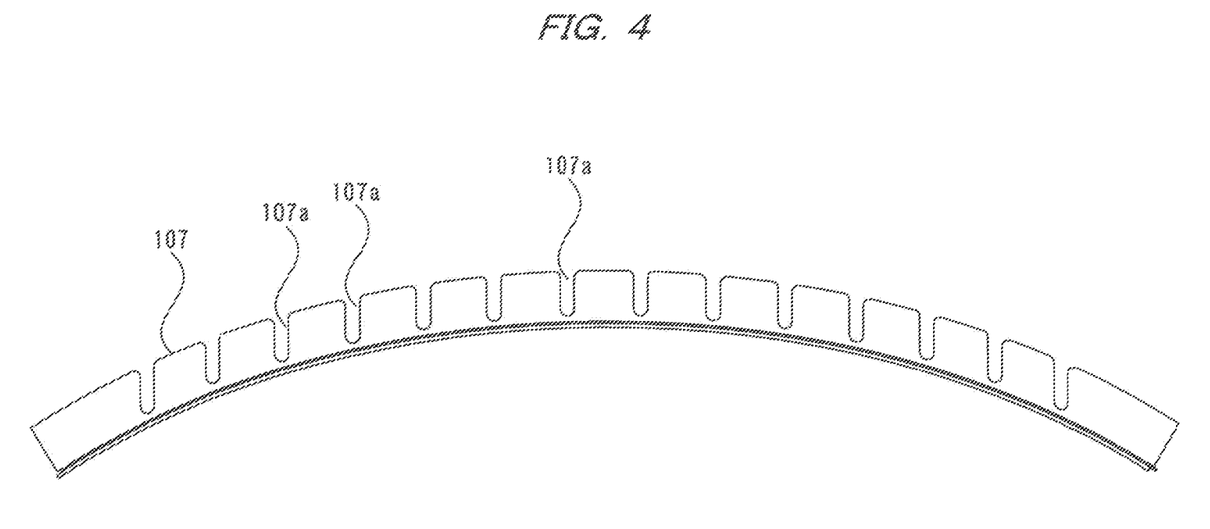
FIG. 4 is a front view of another inner plate of the segment.

FIG. 4 is a detailed view of the inner plate 107. The inner plate 107 is a thin-plate member having a profile that substantially coincides with the side plates 102, 103. A plurality of notches 107a is provided from the vicinity of the lower end towards the upper end of the inner plate 107. The positions of the notches 107a in the circumferential direction coincide at the lower section thereof with those of the holes 102a in the side plate 102 and the holes 106a in the inner plate 106. The notch 107a at the center of the segment 1 is perpendicular to the inner surface plate 101, and the other notches 107a are oriented so as to be parallel to the notch 107a in the center. Such an arrangement facilitates removal from the mold when the segment is integrally formed.

Figure 5C:
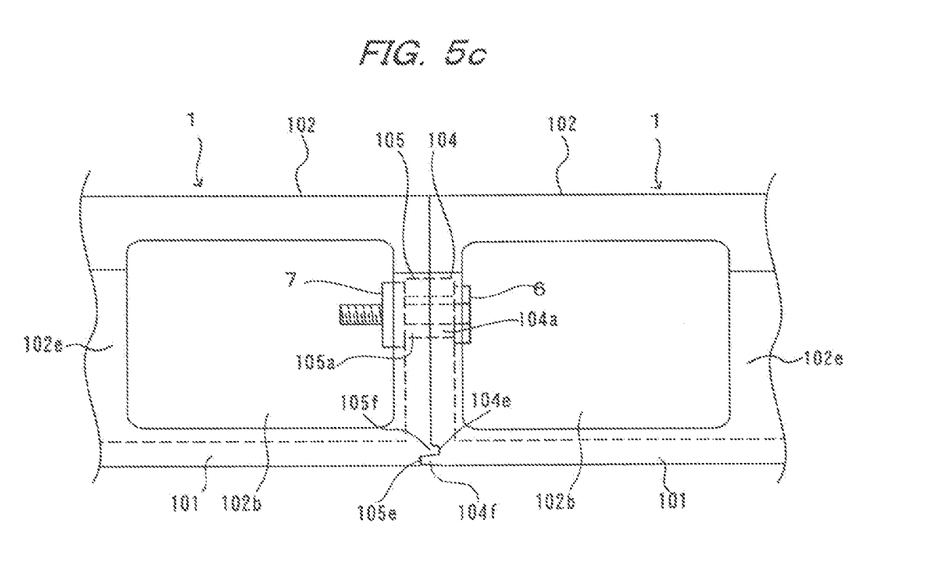
FIG. 5c is a front view showing the segments linked in the circumferential direction.

FIGS. 5a, 5b, and 5c show a method for linking the segments 1 in the circumferential direction. Two segments 1, 1 are held so that the end plate 105 of one of the segments and the end plate 104 of the other segment are in contact with each other. A wrench or another tool, or a technician's finger, is inserted from the opening 102b in the side plate 102 of the segment, and a bolt 6 is inserted into the insertion holes 104a, 105a. A nut 7 is then threadedly engaged to the bolt 6, thereby tightening both end plates 104, 105 and linking the two segments 1, 1 in the circumferential direction. The concave section 104c and convex section 105c that fit into the concave section 104c are formed on the end plate 104 and the end plate 105 at a position at which they intersect with the inner plate 107.

A concave section 104e and a convex section 104f are formed along the entire length in the pipe-length direction on a lower end of the end plate 104. A convex section 105f and a concave section 105e that fit with the concave section 104e and the convex section 104f are formed along the entire length in the pipe-length direction on a lower end of the end plate 105. Such an arrangement facilitates the task of positioning the two segments 1 and bringing the two segments in close contact with each other when the segments are linked in the circumferential direction. Also, applying a sealing material (not shown) to the fitting section makes it possible to enhance the water-tightness of the linking section. Bolting as described above is performed in two locations, i.e., between the side plate 102 and the adjacent inner plate 106, and between the side plate 103 and the adjacent inner plate 106. In an instance in which the linking in two locations as described above results in insufficient linking strength, a linking member is also positioned in other insertion holes 104a, 105a, from above the segment, between the inner plates 106, 107 to strengthen the linking in the circumferential direction.

In FIG. 5a, one bolt/nut set is used per location. However, in an instance in which the end plates 104, 105 have a large height because of segments used for large-diameter existing pipes, the segments can be linked in the circumferential direction using two or more bolt/nut sets per location.

The segments are thus linked in the circumferential direction through the openings 102b, 103b provided to the side plates 102, 103. When the segments are linked in the pipe-length direction so that the opening 102b of the segment is in alignment with the opening 103b of the adjacent segment and both the segments come in close contact with each other, each set of the openings 102b, 103b forms a single integral opening. Therefore, when the filler material is injected into the spacing between the existing pipe and the rehabilitation pipe after installation of the rehabilitation pipe, the filler flows in or out through the integrated openings 102b, 103b without flowing downwards towards the interior of the rehabilitation pipe. Therefore, there is no need to block the openings 102b, 103b, and linking in the circumferential direction can be performed in a simpler manner compared to an instance in which an opening is provided to the inner surface plate 101.

By sequentially linking the segments 1 in the circumferential direction around the full circumference, it is possible to assemble a closed ring-shaped short pipe assembly 10 (hereafter referred to as "pipe unit") having a predetermined small length in the pipe-length direction X as shown in FIG. 6. The pipe unit 10 has a shape that can be obtained when a circular pipe is sliced at a predetermined width D perpendicularly to the pipe-length direction X. The outside diameter of the pipe unit 10 is slightly smaller than the inside diameter of the existing pipe to be rehabilitated. The segment 1 corresponds to a member obtained by dividing the pipe unit 10 into a plurality of (preferably equal) portions along a cutting surface parallel to the radial direction R.

In FIG. 6, the inner surface plate 101, the side plates 102, 103, and the end plates 104, 105, which are the principal structural members of the segment 1, are shown. In order to prevent the drawing from becoming complicated, the inner plates 106, 107 and other reinforcement structures are not shown.

Figure 7:
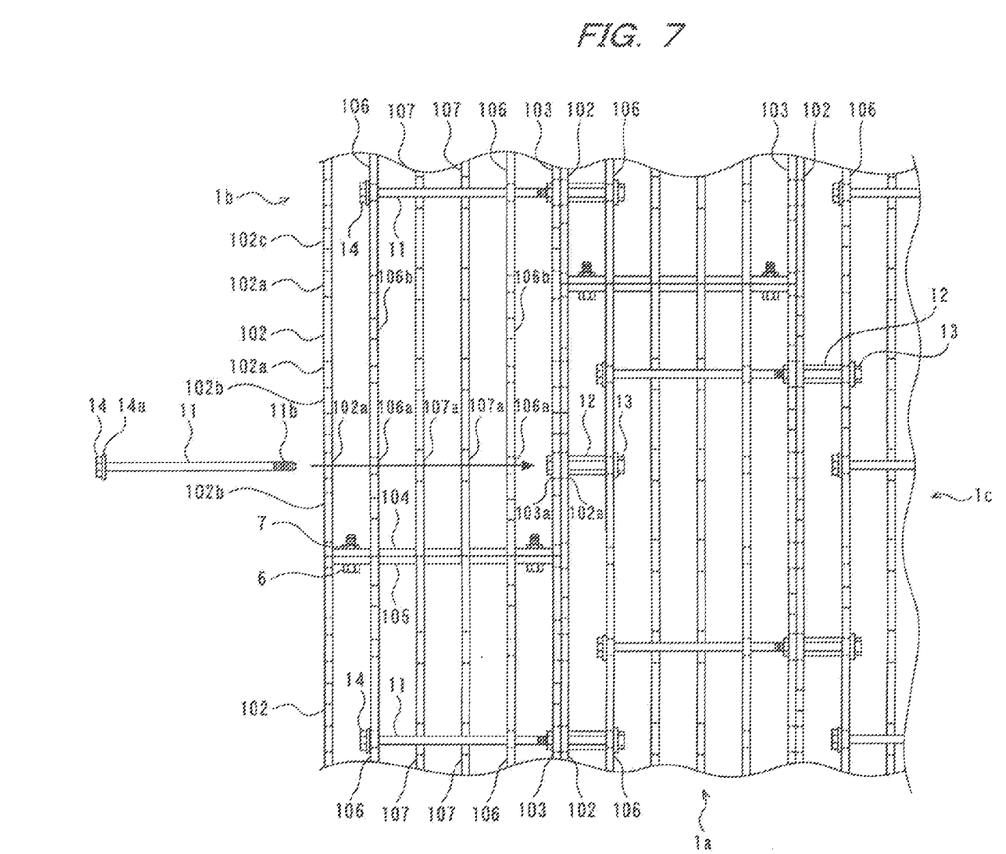
FIG. 7 is an illustrative view showing a state in which the segments of the pipe units are linked in the pipe-length direction using linking members.

Each of the segments in the pipe unit 10 of such description is linked to a segment of another pipe unit using a linking member (tightening member) 11 and a nut 12 as shown in FIG. 7 for extension in the pipe-length direction.

The nut 12 is passed through a hole 102a in the side plate 102 of one segment 1a and brought into contact with the first inner plate 106, i.e., the inner plate 106 positioned nearest to the side plate 102. A bolt 13 is threaded into the nut 12, and the nut 12 is tightened against the inner plate 106 and fixed against it.

The length of the nut 12 in the pipe-length direction is slightly greater than the spacing between the side plate 102 and the inner plate 106, and is such that the nut 12 protrudes outwards from the side plate 102 of the segment 1a when positioned as above. The amount of protrusion is equivalent to or greater than the thickness of the side plate 103 of the other segment 1b. Therefore, the nut 12 is passed through the hole 103a in the side plate 103 of the other segment 1b, and the two segments 1a, 1b are placed against each other.

In this state, a linking member 11 is passed through a hole 102a in the side plate 102, a hole 106a in the inner plate 106, and a notch 107a in the inner plate 107 of the segment 1b, and a threaded section 11b of the linking member 11 is threaded into the nut 12 to link the linking member 11 and the nut 12. The linking member 11 is further threaded into the nut 12 until a flange section 14a of a head section 14 presses against the leftmost inner plate 106 of the segment 1b to tighten and fix the two segments 1a, 1b.

A plurality of the nuts 12 are fixed along the circumferential direction to each segment, the nuts 12 being fixed to every second hole 102a, or at less regular intervals, depending on the required strength. The segments are linked in the pipe-length direction with the nut positions in each segment being displaced in the circumferential direction relative to the nut positions in the segment adjacent to the segment in question. For example, in the example shown in FIG. 7, the positions of the nuts 12 in the segment 1a in the center is displaced relative to the positions of the nuts 12 in the segment 1c adjacent to the right side of the segment 1a by an amount corresponding to the intervals between the holes 102a in the side plate 102 as viewed in the circumferential direction.

Thus, the segments of the pipe unit are linked in the pipe-length direction to the segments of another pipe unit, whereby it is possible to link the pipe units in the pipe-length direction to a desired length, and to create a rehabilitation pipe comprising the pipe units or the segments.

A description will now be given for a method for rehabilitating an existing pipe using the segments configured as described above.

Figure 8:
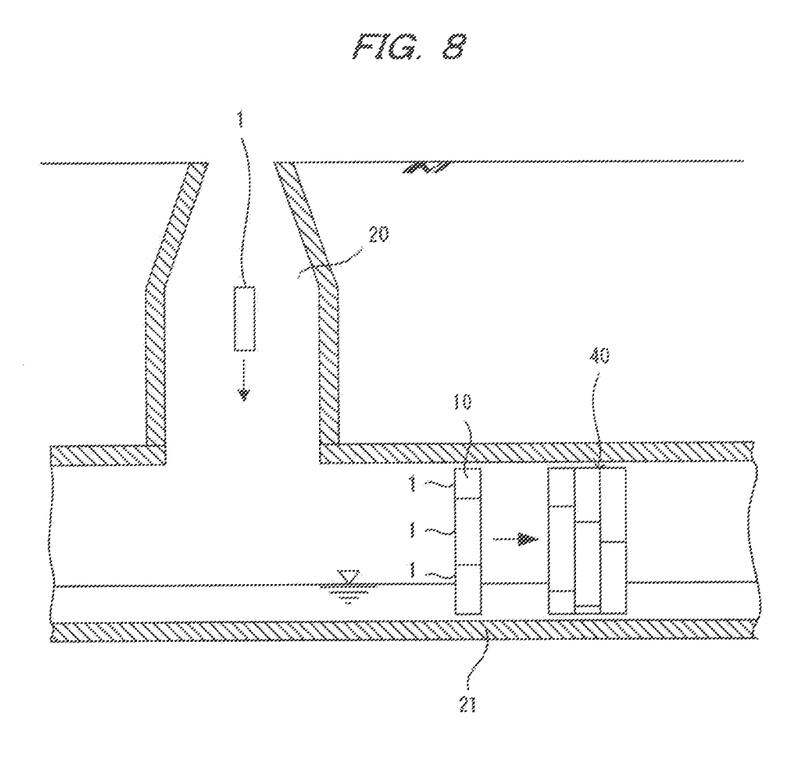
FIG. 8 is an illustrative view showing a state in which the pipe units are linked and the rehabilitation pipe is installed in the existing pipe.

First, as shown in FIG. 8, the segment 1 is carried through a manhole 20 into an existing pipe 21, and as shown in FIGS. 5 and 6, the segments are sequentially linked in the circumferential direction to assemble the pipe unit 10.

Figure 9:
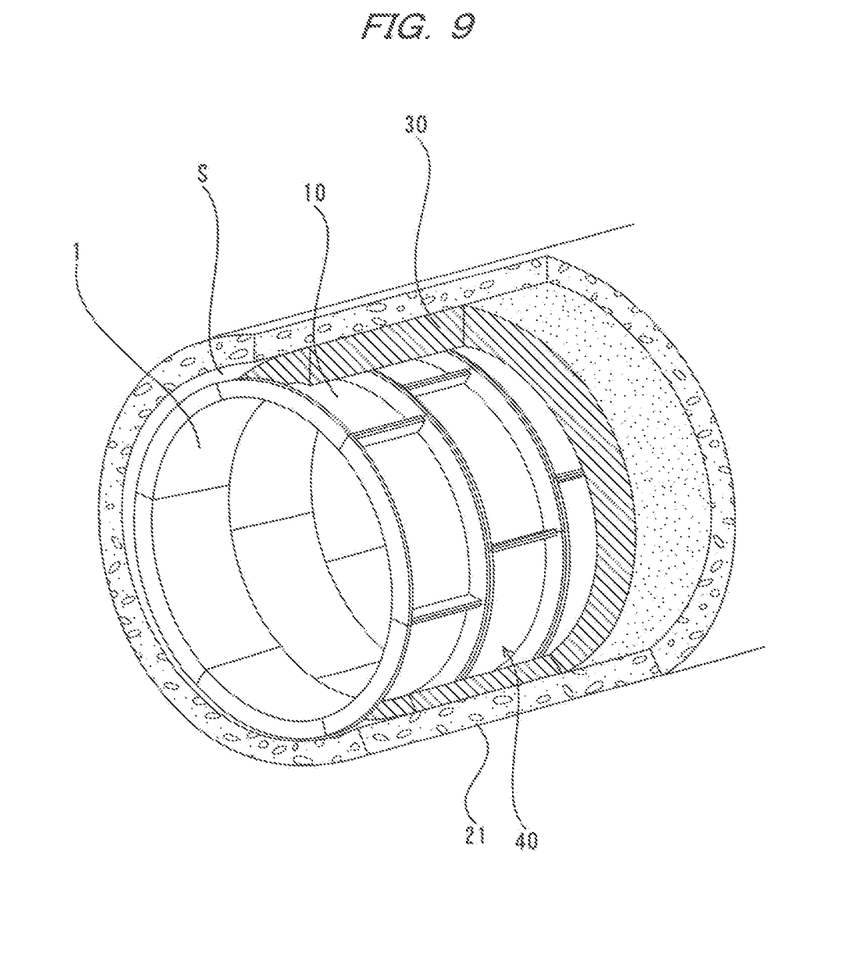
FIG. 9 is a perspective view showing a state in which the pipe units are linked and the rehabilitation pipe is installed in the existing pipe.

Next, the pipe units 10 are sequentially linked in the pipe-length direction via the linking members 11 using the method shown in FIG. 7, and as shown in FIGS. 8 and 9, the rehabilitation pipe 40 is installed in the existing pipe 21. In FIGS. 8 and 9, the linking members 11 and similar elements are not shown, and the segments are shown in a simplified manner.

In FIGS. 7 through 9, the segments or the pipe units are linked in the pipe-length direction such that the segment and the segment adjacent thereto are offset to each other in the circumferential direction and the end plates of both the segments are out of alignment in the pipe-length direction. Such an arrangement makes it possible to automatically block the openings 102b, 103b of the side plates 102, 103 by the side plates of the adjacent segment. Therefore, there is no need to block the openings 102b, 103b, and linking in the circumferential direction can be performed in a simpler manner.

If the diameter of the rehabilitation pipe is large, the segments 1 that have been carried in can be transported to the location of actual installation, and the segments are linked in the circumferential direction and the pipe-length direction at this location. In such an instance, there may be instances in which the gap between the outside of the segments and the existing pipe is narrow when linking the segments in the circumferential direction. This may obstruct the mounting of bolt-and-nut sets from the outside of the segment; the benefit of providing the side plates with openings for linking the segments in the circumferential direction is particularly high.

Next, as shown in FIG. 9, a grout material or another filler material 30 is injected into a space S between the rehabilitation pipe 40 and the existing pipe 21, and the filler material is hardened. Both end sections of the space S are blocked using a resin pate, mortar, or another sealing agent. For injection of the filler material, an injection hole is formed in, e.g., the inner surface plate 101, and the filler material 30 is injected therefrom.

Injection is performed until the filler material 30 has reached the entirety of the rehabilitation pipe and has started to flow out from the side plates of segments on both ends in the pipe-length direction. During injection, the filler material 30 don't flow out from the openings 102b, 103b of the side plates 102, 103 into the inside of the rehabilitation pipe 40. Such openings, therefore, improve the efficiency of the linking operation and the injection operation.

Since the notches 102c, 103c, 106b are respectively provided to the side plates 102, 103 and the inner plate 106 of the segment 1, the filler material can flow smoothly in the pipe-length direction even if the space S is small or if an obstacle is present in the space S. Also, since the notches 102c, 103c formed in the side plate 102 or 103 and the notches 106b formed in the adjacent inner plate 106 are staggered when the segment is viewed from above (outside), the filler material is injected in a zigzag shape, thus allowing the filler material to be injected in a uniform manner.

The height of the end plates 104, 105 is smaller than the height of the side plates 102, 103 and the inner plates 106, 107, and there is a significant gap between the upper end of the end plates 104, 105 and the existing pipe 21; therefore, the filler material can also flow smoothly in the circumferential direction. The holes 104*d*, 105*d* provided to the lower section of the end plates 104, 105 not only allow the filler material to flow in or flow out and pass through, but also function as a passage for air between the existing pipe 21 and the inner surface plate 101 pushed out when injecting the filler material, therefore allowing the filler material to flow in an even smoother manner.

The injected filler material 30 allows the existing pipe 21 and the rehabilitation pipe 40 to be solidly bound when it is hardened, and it becomes possible to create a composite pipe comprising the existing pipe, the filler material, and the rehabilitation pipe.

What is claimed is:

1. A segment for a rehabilitation pipe, the segment comprising:
   an inner surface plate having an inner circumferential surface, side plates and end plates provided upright on a peripheral edge of the inner surface plate, and inner plates provided upright between the side plates so as to be parallel to the side plates, the inner surface plate, the side plates, the end plates and the inner plates being formed integrally from a plastic material, and the segments being linked in a circumferential direction and in a pipe-length direction to install a segmental rehabilitation pipe inside an existing pipe;
   wherein the side plates and the inner plates are provided at respective upper edges thereof with a plurality of notches for passing therethrough a filler material injected into a space between the existing pipe and the rehabilitation pipe when installing the rehabilitation pipe in the existing pipe, the positions of the notches provided to the side plates being different in the circumferential direction from those of the notches provided to the inner plates; and
   wherein the side plates are further provided with insertion holes configured for receiving therethrough a linking member for linking the segments in the pipe-length direction, the insertion holes provided to the side plates being staggered in the circumferential direction relative to the notches provided to the side plates.

2. A pipe unit for a rehabilitation pipe used to rehabilitate an existing pipe, the pipe unit comprising a plurality of segments according to claim 1 mutually linked in a circumferential direction of the pipe unit.

3. A pipe rehabilitation method for installing a rehabilitation pipe inside an existing pipe, the method comprising:
   providing a plurality of segments each comprising an inner surface plate having an inner circumferential surface, side plates and end plates provided upright on a peripheral edge of the inner surface plate, and inner plates provided upright between the side plates so as to be parallel to the side plates, the inner surface plate, the side plates, and the end plates being formed integrally from a plastic material, the side plates and the inner plates being provided at respective upper edges thereof with a plurality of notches for passing a filler material therethrough so that positions of the notches provided to the side plates are different in the circumferential direction from those of the notches provided to the inner plates, and the side plates being further provided with insertion holes configured for receiving therethrough a linking member for linking the segments in the pipe-length direction, the insertion holes provided to the side plates being staggered in the circumferential direction relative to the notches provided to the side plates;
   sequentially linking the segments in the circumferential direction and the pipe-length direction to install a segmental rehabilitation pipe inside the existing pipe; and
   injecting a filler material into a space between the existing pipe and the rehabilitation pipe, the filler material being caused to flow in or out through the notches in the side and inner plates during injection.

4. A rehabilitation pipe for rehabilitating an existing pipe, the rehabilitating pipe comprising: a plurality of pipe units according to claim 2 mutually coupled together in a longitudinal direction of the existing pipe to assemble the rehabilitating pipe.

* * * * *